US007840556B1

(12) United States Patent
Dayal et al.

(10) Patent No.: US 7,840,556 B1
(45) Date of Patent: Nov. 23, 2010

(54) MANAGING PERFORMANCE OF A DATABASE QUERY

(75) Inventors: Umeshwar Dayal, Saratoga, CA (US); Harumi Kuno, Cupertino, CA (US); Stefan Krompass, Garching (DE); Maria G. Castellanos, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 11/831,902

(22) Filed: Jul. 31, 2007

(51) Int. Cl.
*G06F 17/30* (2006.01)
(52) U.S. Cl. ............................. 707/721; 707/999.003
(58) Field of Classification Search .............. 707/1–6, 707/10, 100, 101, 200, 205, 718, 719, 721, 707/999.003, 999.006, 999.007
See application file for complete search history.

(56) References Cited

U.S. PATENT DOCUMENTS

| | | | | |
|---|---|---|---|---|
| 6,092,062 | A * | 7/2000 | Lohman et al. ................. | 1/1 |
| 6,529,901 | B1 * | 3/2003 | Chaudhuri et al. ............. | 707/3 |
| 6,845,380 | B2 | 1/2005 | Su et al. | |
| 7,415,455 | B2 * | 8/2008 | Karn et al. ..................... | 707/2 |
| 7,577,667 | B2 * | 8/2009 | Hinshaw et al. ................ | 1/1 |
| 2003/0061244 | A1 * | 3/2003 | Hirohata ...................... | 707/200 |
| 2003/0172059 | A1 * | 9/2003 | Andrei ......................... | 707/3 |
| 2005/0119999 | A1 * | 6/2005 | Zait et al. ...................... | 707/3 |
| 2006/0167865 | A1 | 7/2006 | Andrei | |
| 2008/0195577 | A1 * | 8/2008 | Fan et al. ...................... | 707/2 |
| 2009/0024563 | A1 * | 1/2009 | Sengar ......................... | 707/2 |
| 2010/0082602 | A1 * | 4/2010 | Ganapathi et al. ............ | 707/718 |

OTHER PUBLICATIONS

Yao, Z., Chen, C. M., and Roussopoulos, N. 1996 Adaptive Cost Estimation for Client-Server Based Heterogeneous Database Systems. Technical Report. UMI Order No. CS-TR-3648., University of Maryland at College Park.

"Plastic: PLAn Selection Through Incremental Clustering", printed out from http://dsl.serc.iisc.ernet.in/projects/PLASTIC/index.html on Jul. 22, 2007.

Kave Eshghi, Hsiu Khuern Tang, "A Framework for Analyzing and Improving Content-Based Chunking Algorithms", HPL-2005-30R1, 20051005.

Ghosh, A., Parikh, J., Sengar, V. S., and Haritsa, J. R. 2002. Plan selection based on query clustering. In Proceedings of the 28th international Conference on Very Large Data Bases—vol. 28 (Hong Kong, China, Aug. 20-23, 2002). Very Large Data Bases. VLDB Endowment, 179-190.

Song, In-sang; Paik, Ju-ryun; Kim, Ung-mo, "Semantic-based Similarity Computation for XML Document", Multimedia and Ubiquitous Engineering, 2007. MUE '07. International Conference on, pp. 796-803, Apr. 2007.

(Continued)

*Primary Examiner*—Marc R Filipczyk

(57) ABSTRACT

Provided are, among other things, systems, methods and techniques for processing database queries, such as the following. A current database query to be executed is obtained, and a plan for executing the current database query is generated. A cluster that includes at least one previously executed database query is identified, based on similarity of the plan for executing the current database query to execution-plan information representing the cluster. Then, a query-execution characteristic is assigned to the current database query based on corresponding characteristic information representing the cluster, and performance of the current database query is managed based on the query-execution characteristic.

18 Claims, 6 Drawing Sheets

OTHER PUBLICATIONS

Val Henson and Richard Henderson "Guidelines for Using Compare-by-hash", http://infohost.nmt.edu/~val/review/hash2.html, Last updated: Thu Oct. 21 01:25:42 MDT 2004.

Val Henson, "An Analysis of Compare-by-hash", http://www.usenix.org/events/hotos03/tech/full_papers/henson/henson_html/hash.html, Jun. 16, 2003.

Reddy, N. and Haritsa, J. R. 2005. Analyzing plan diagrams of database query optimizers. In Proceedings of the 31st international Conference on Very Large Data Bases (Trondheim, Norway, Aug. 30-Sep. 2, 2005). Very Large Data Bases. VLDB Endowment, 1228-1239.

Tree Edit Distance, Alignment Distance and Inclusion by Philip Bille, IT University Technical Report Series, TR-2003-23 dated Mar. 2003 (p. 1-22).

Algorithms for Approximate String Matching by Esko Ukkonen, Information and Control, Academic Press, vol. 64, Nos. 1-3, Jan./Feb./Mar. 1985 (19 pages).

A General Method Applicable to the Search for Similarities in the Amino Acid Sequence of Two Proteins, Needleman et al., J. Mol. Biol. (1970) 48, (p. 443-453).

* cited by examiner

MANAGING PERFORMANCE OF A DATABASE QUERY

FIELD OF THE INVENTION

The present invention pertains to processing database queries, e.g., by estimating a characteristic of executing a database query prior to actually performing the query.

BACKGROUND

One conventional approach to estimating the cost of executing a structured query language (SQL) query, prior to actual execution of the query, is to save the historical execution costs associated with previous SQL queries. Then, when a new SQL query is submitted for consideration, that new SQL query is compared to the previous SQL queries in order to identify a "similar" previous query. The historical execution cost for that "similar" previous query is then used as the estimate for the new query. More specifically, the comparison involves a direct comparison of the SQL statements themselves.

While this approach sometimes is useful where a new SQL query is exactly identical to a previous SQL query (in terms of both structure and data), the present inventors have discovered that it often produces unreliable results when the supposed "similar" previous query statement is only slightly different than the current query statement (e.g., a difference in a single data field). As a result, such an approach often is not very useful for the extremely complex one-of-a-kind SQL statements common in data-warehouse/business-intelligence systems (some of which essentially being programs consisting of hundreds of lines of SQL code).

DESCRIPTION OF THE PREFERRED EMBODIMENT(S)

Figure 1:
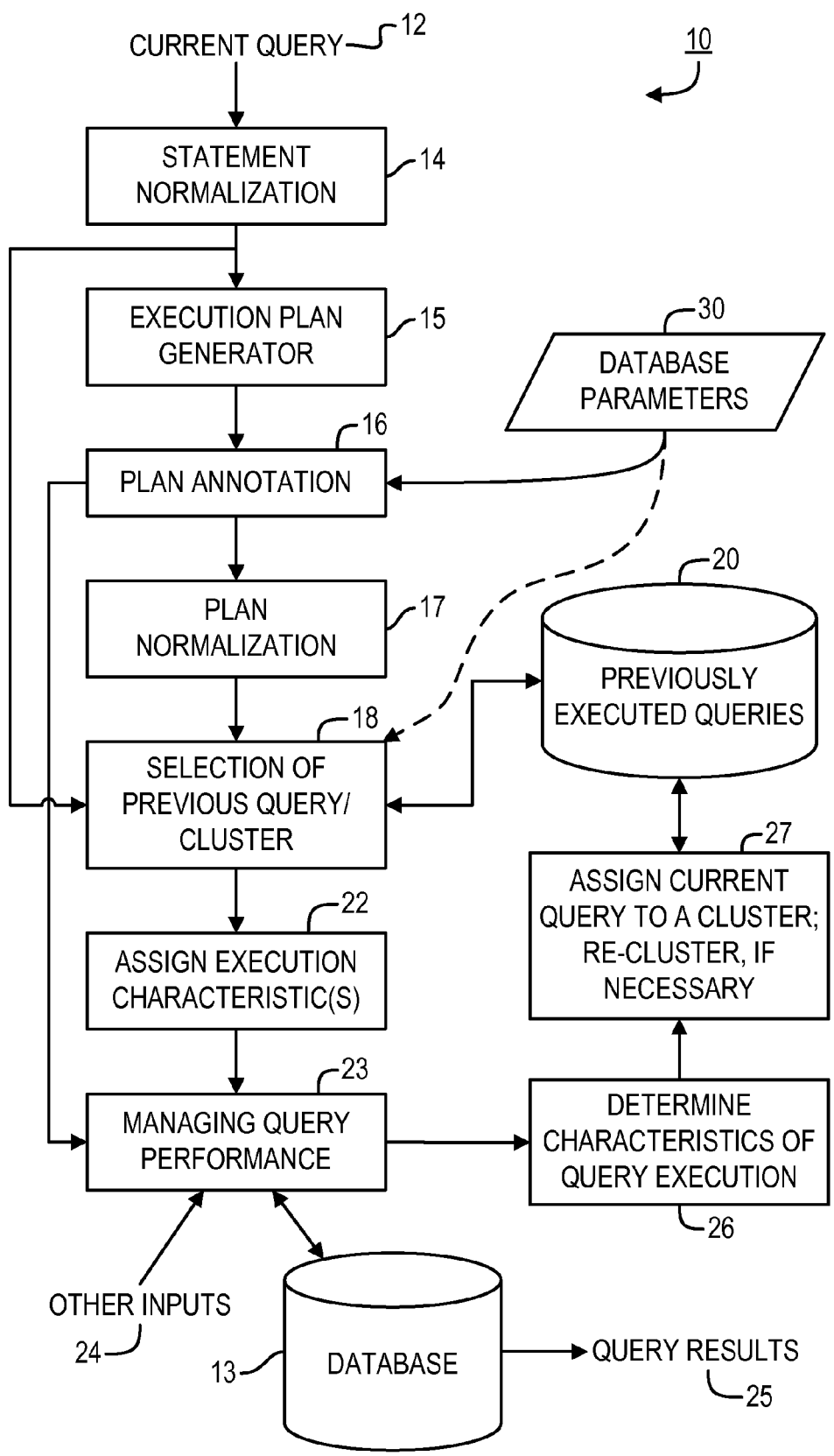
FIG. 1 is a block diagram of a system for processing database queries.

FIG. 1 is a block diagram of a system 10 for processing database queries according to a representative embodiment of the present invention. Each of the functional components shown in FIG. 1 preferably is fully automated, meaning that its functionality can be implemented in software (as computer-executable steps) or in any of the other ways described herein. Also, it is noted that in the various embodiments of the present invention, one or more of the individual components shown in FIG. 1 are omitted or bypassed.

Input to the system 10 is a query 12 that has been written against a database 13. For example, if database 13 is a structured query language (SQL) database, then query 12 preferably is written as a SQL statement. Although only a single query 12 is illustrated in FIG. 1, in practice a steady stream of queries will be input by system 10.

Also, although database 13 is illustrated as a single component, in practice database 13 often will be divided into a large number of separately searchable tables or partitions. Those tables or partitions, in turn, often will be divided across multiple different physical devices (e.g., disks and/or servers), and even individual tables often are divided across different devices (e.g., to facilitate simultaneous access by increasing parallelism). Still further, database 13 can incorporate a certain amount of data redundancy in order to protect against data loss and/or to accommodate processing demands. Due to the complexity of database 13, execution of any particular query typically requires the generation of an execution plan which, as noted above, can be fairly involved.

In component 14, the current query 12 is normalized. That is, its statement text is put into a standard format. Conventional normalization techniques can, e.g., be used for this purpose.

In component 15, a plan for executing the query is generated. As noted above, the database 13 often will be highly partitioned. At the same time, the query 12 often will require extraction of data from multiple different tables and then combination of such data in the appropriate manner in order to provide the desired output results. For example, even the simple query, "Find all current employees who earned more than $100,000 last year," might require access to multiple tables of personnel data, multiple tables of accounting data and/or multiple tables of employee benefit data, and then combination of the retrieved data in a manner appropriate to generate the requested list.

An existing query optimizer (e.g., the one associated with database 13), e.g., can be used to generate the query plan. Generally speaking, such an existing query optimizer inputs a query statement, examines several potential execution plans and then attempts to select the most optimal plan. The plan generated by component 15 contains all of the structure of the query execution and, typically, it is hierarchical in nature, requiring certain lower-level actions to be performed first and then synthesizing the results at the higher levels.

After the plan has been generated, in component 16 it preferably is annotated based on certain parameters 30 of the database 13. Those parameters 30 can include, e.g., any or all database metadata, such as schema definitions, statistics, key selectivities and/or database constraints (e.g., referential integrity constraints). The annotations that are inserted (sometimes referred to herein as "cardinalities") by this component 16 into the plan generated by component 15 preferably provide an indication of the amount of effort involved in performing the individual steps of the plan. For example, with respect to individual table queries or file scans, such annotations preferably provide estimates of the number of documents that will be returned, and with respect to other steps, the annotations preferably provide estimates of the number of documents processed. However, in alternate embodiments, e.g., the annotations for individual table queries provide estimates of the number of documents being searched. In any event, such cardinalities preferably are calculated in a straightforward manner based on the database parameters 30 and/or based on comparisons to similar query steps performed in the past.

Figure 2:
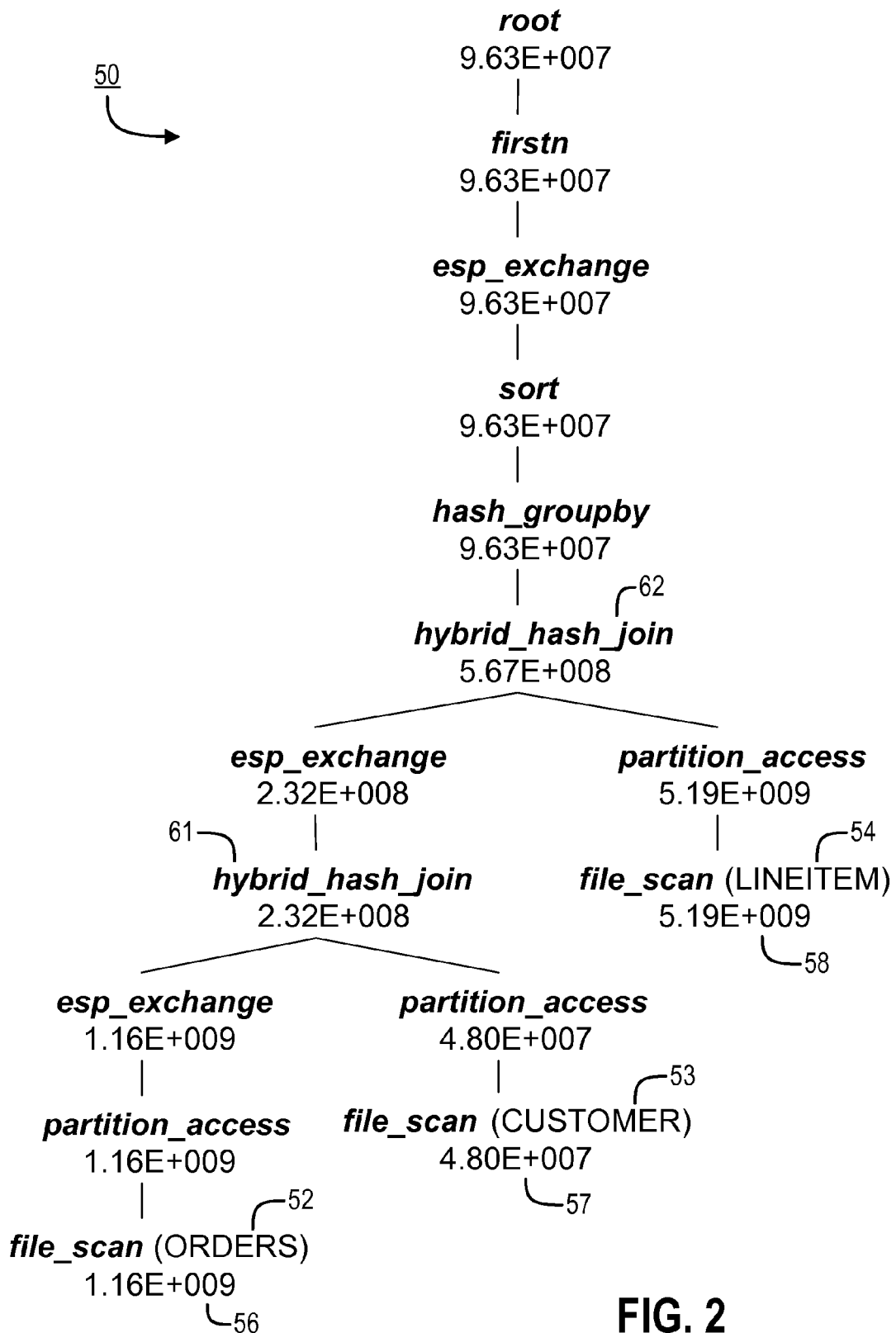
FIG. 2 illustrates an example of an annotated database query plan.

An example of an annotated plan 50, as produced by component 16, is graphically illustrated in FIG. 2. As shown, plan 50 is hierarchical in nature and is executed from the bottom up. The individual nodes correspond to the individual steps performed according to the annotated plan. Thus, for example, steps 52-54 are file scans of the tables Orders, Customer and LineNumber, respectively. The corresponding cardinalities 56-58 for steps 52-54, respectively, indicate an estimate of the expected number of documents to be returned. The higher-level combining steps 61 and 62 then merge the individual search results underneath them (e.g., by finding the intersection set, the union set or according to any other criterion).

It should be noted that although FIG. 2 illustrates plan 50 graphically, this depiction is solely for the purpose of facilitating the present description. The actual annotated plan output by component 16 typically is in the form of machine-readable code and is more directly converted to a nested text string.

Returning to FIG. 1, in component 17 the annotated plan output by component 16 (or the simple plan structure output by component 15 in embodiments where annotation is not used) is normalized. That is, the description of the plan is put into a standard format.

Figure 3:
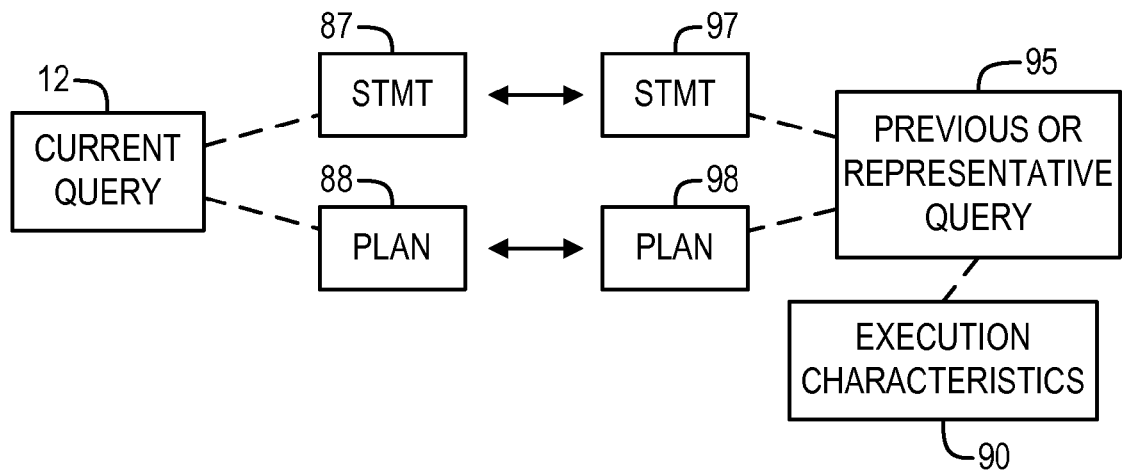
FIG. 3 is a block diagram illustrating the comparison of a current query to a previously executed or representative query.

The normalized plan from component 17 (together with the normalized query statement from component 14, in certain embodiments) is input into component 18. In other words, as shown in FIG. 3, the current query 12 preferably is represented by its query statement 87 (preferably normalized) and/or its generated query plan 88 (preferably normalized and annotated). Based on this information, a matching previously executed database query, or a cluster of such previously executed database queries, is then identified by component 18. It is noted that a single query can be seen as a special case of a cluster, where the cluster size happens to include or has been defined to include exactly 1 previously executed query.

In the present embodiment, the identified query or cluster is identified by component 18 from a saved set 20 (shown in FIG. 1) of a large number of previously executed database queries. In this regard, as shown in FIG. 3, set 20 preferably includes, for each previously executed query 95 against database 13: the database query statement 97 (e.g., as originally input by the user, preferably normalized), the execution plan 98 for the query (e.g., as previously generated by components 15-17, i.e., preferably normalized and annotated), and one or more query-execution characteristics 90 that were observed when the query was actually executed against database 13. As discussed in more detail below, either or both of the query statement 97 and the execution plan 98, rather than being stored in their original forms, instead can be stored using some other representative data, such as a hash of the original data.

The query-execution characteristics 90 can include, for example, the total cost of executing the query (e.g., total execution time or any other measure of the total system cost), particular systems resources that were utilized during execution of the query, and/or a measure of the impact on particular system resources (e.g., the amount of time a particular resource was accessed and/or the number of data records that were returned from a particular resource or were searched within such resource).

As shown in FIG. 3, the current query 12 preferably is compared against a particular previous query or a representative query 95 by comparing their respective query statements 87 and 97 and/or their respective query-execution plans 88 and 98. In the latter case, in certain embodiments in which the previously executed queries are clustered within set 20, one or more representative queries 95 are identified or synthesized for each cluster (e.g., representing the center of the cluster). For example, the query-statement information 97 and the query-execution plan information 98 that represents the cluster can be chosen as the query statement 97 and query-execution plan 98, respectively, for the previously executed query that has the minimum aggregate distance to the other previously executed queries in the cluster (e.g., using any of the distance metrics discussed below). Alternatively, such representative information can be synthesized by, e.g., combining portions of query statements and execution plans, respectively, from two or more previously executed queries that are closest to the center of the cluster. In a more specific example of the latter approach: the synthesized statement (or plan) has all of the common elements of such queries; where the statements (or plans) differ in cardinalities, the mean, median or other representative number is used; and/or where the statements (or plans) differ in text and/or cardinalities the text or cardinalities are chosen to minimize the distance to the other previously executed queries within the cluster.

Various sequences and combinations of such comparisons are used in the various embodiments of the invention, as discussed in more detail below. In addition, the manner in which two query statements are compared against each other, and/or the manner in which two query execution plans are compared against each other, can be different in different embodiments of the invention. Preferably, however, each such comparison (or a combination of the two comparisons for a particular query 95) results in a similarity score. In alternate embodiments, any other technique for identifying a closest cluster to the current query (e.g., based on similarity of query statements and/or query-execution plans) is used.

As noted above, each query statement 87 and 97 preferably is a string of code (e.g., text), so any technique used to compare the similarity of two strings of text can be used to compare the two query statements 87 and 97, including normalization/exact match. However, the currently preferred techniques for comparing two query statements 87 and 97, according to the present invention, are as follows.

A first set of query-statement-comparison techniques is based on "edit distance". Here, simple edit operations (e.g., insert, delete, replace, transpose), e.g., operating on individual characters, are defined for transforming one string into another; then, a count is made of the minimum number of operations required to transform one of the query statements 87 and 97 into the other (or, more generally, the minimum cost of transforming one of the query statements 87 and 97 into the other). Thus, for example, the edit distance between Virginia and Vermont is 5, as follows:

1) Virginia→Verginia (replace)

2) Verginia→Verminia (replace)

3) Verminia→Vermonia (replace)

4) Vermonia→Vermonta (replace)

5) Vermonta→Vermont (delete)

There are several different techniques for defining or calculating this measure (e.g., Hamming distance, Levenshtein distance, etc). For example, any of the techniques described in any following references can be used: V. I. Levenshtein, "Binary codes capable of correcting deletions, insertions and reversals," Doklady Akademii Nauk SSSR 163(4) p 845-848, 1965, also Soviet Physics Doklady 10(8) p 707-710, February 1966; S. B. Needleman and C. D. Wunsch, "A general method applicable to the search for similarities in the amino acid sequence of two proteins," Jrnl Molec. Biol. 48 p 443-453, 1970; or E. Ukkonen, "On approximate string matching," Proc. Int. Conf. on Foundations of Comp. Theory, Springer-Verlag, LNCS 158 p 487-495, 1983.

In certain embodiments, the similarity score is simply the edit distance count. In other embodiments, the similarity score is a function of the count, or a function of the individual edit operations (e.g., weighting certain kinds of operations differently than others).

A second set of techniques for comparing two query statements 87 and 97 is "Compare-by-Hash", in which the two query statements 87 and 97 are compared based on one or more cryptographic hashes of their contents. Each query statement 87 and 97 is provided to a hash function (the hash of statement 97 preferably having been pre-computed and stored in set 20, e.g., in place of the original statement 97). The statements are considered "similar" if the resulting hash values are the same. This method can result in hash collisions, so query two statements can be considered similar even if they are not identical. Generally speaking, the amount of similarity required in order to declare a match can be controlled by changing the length of the hash, with longer hashes requiring the two query statements to be more identical to each other for the match to be declared. More specific techniques which can be used are described, e.g., in V. Henson and R. Henderson, "Guidelines for Using Compare-by Hash", Forthcoming, 2005; and Val Henson, 2003, "An analysis of compare by hash", Hot Topics in Operating Systems 2003.

One variation of the Compare-by-Hash techniques is to divide the query statement into chunks and then to calculate a hash-based fingerprint for each chunk. In these embodiments, content-based chunking (which breaks a text string into a sequence of chunks in a way that the chunk boundaries are determined by the local contents of the string) preferably is used. Such content-based chunking is distinguished from fixed-size chunking (which determines chunk boundaries based on distance from the beginning of the text string). The former is preferred because it generally is less sensitive to minor edits. One example of such content-based chunking which can be used is described in Kaye Eshghi and Hsiu Khuern Tang, "A Framework for Analyzing and Improving Content-Based Chunking Algorithms", HPL-2005-30(R.1), HP Laboratories Palo Alto, Sep. 22, 2005. Another variation of the Compare-by-Hash techniques is to use one or more approximate hashes rather than cryptographic hashes.

As indicated above, each query execution plan 88 and 98 preferably can be viewed as a tree of code (e.g., text) strings or, alternatively, as a single long flattened string of code (e.g., text). Accordingly, the techniques for comparing query execution plans 88 and 98 can be divided into two groups, depending upon which of these representations is used. As to the latter, any of the techniques described above (e.g., edit distance or hash-based techniques) can be used where each of the query execution plans 88 and 98 is represented as a single long flattened string of code (e.g., text). As to the former, examples of tree-based techniques include the following.

A first set of tree-based techniques for comparing query execution plans 88 and 98 is referred to as "tree edit distance". The approach is similar to that described above for "edit distance", but because trees, rather than strings, are involved, the transformation operations preferably are different. For example, in one representative embodiment the defined operations include: vertex removal, vertex insertion and/or vertex replacement. As with certain embodiments of string edit distance, a cost preferably is assigned to each of the transformation operations. The "tree edit distance" approaches preferably determine the minimal set of operations (i.e., the one with the minimum overall cost) to transform one tree into another. Various different existing techniques are available to compute the tree edit distance, and any of them could be used to compare the tree for the current query plan 88 to the tree of the query plan 98 for a selected query 95. Examples include the techniques described in S. M. Selkow, "The tree-to-tree editing problem," information Processing Letters, 6:184-186, December 1977; P. Bille, "Tree edit distance, alignment distance and inclusion," IT University Technical Report Series TR-2003-23, IT University of Copenhagen, March 2003; K. Zhang, D. Shasha, J. T. L. Wang, "Simple fast algorithms for the editing distance between trees and related problems," SIAM Journal of Computing, 18:1245-1262, 1989; and G. Valiente, "Tree edit distance and common subtrees," research Report LSI-02-20-R, Universitat Politecnica de Catalunya, Barcelona, Spain, 2002.

A second set of tree-based techniques uses the "compare-by-hash" method, similar to the method described above. For example, one representative embodiment uses the steps of the query plan as the chunk boundaries. That is, Step 1 would constitute a chunk, Step 2 would constitute another chunk, and so on. Hashed chunks for the current query 12 are then compared directly to other hashed chunks for the subject query 95; alternatively, the hashed chunks for the current query 12 are themselves hashed to produce a single number that is compared to a correspondingly generated number for the subject query 95.

In addition to the techniques described above, any method for comparing the similarity of XML documents can be used. For example, certain embodiments use any of the techniques described in U.S. Pat. No. 6,845,380. Other embodiments use any of the techniques described by Christopher C. Yang and Nan Liu (e.g., methods based on an extended vector space model, which consider both document content and structure). See, e.g., Christopher C. Yang and Nan Liu, "Measuring similarity of semi-structured documents with context weights", SIGIR '06: Proceedings of the 29th annual international ACM SIGIR conference on Research and development in information retrieval, ISBN:1-59593-369-7, pages 719-720, 2006. Still further embodiments use any of the techniques described by Song, et al. (e.g., techniques for similarity computation between XML documents that leverage the semantics of the labels). See, e.g., In-sang Song, Ju-ryun Paik, Ung-mo Kim, "Semantic-based Similarity Computation for XML Document", 2007 International Conference on Multimedia and Ubiquitous Engineering (MUE '07), 0-7695-2777-9/07, IEEE Computer Society, 2007. Still further embodiments use any of the techniques described by Su et al. (e.g., techniques for measuring data loss and potential data loss, in which the operands in the transformation operation are scaled to measure their impact on the data loss and potential data loss, and a transformation cost is calculated by considering the data loss, potential data loss, and scaling). See, e.g. U.S. Pat. No. 6,845,380.

The foregoing discussion with respect to component 18 primarily focuses on comparison between the current query 12 and a single potentially matching query 95. However, it should be noted that such one-to-one comparisons often will be computationally expensive and, therefore, more efficient approaches sometimes are preferred. For example, in the cryptographic hash-based techniques described above, or in any other technique where one or more representative values for the query 12 are to be compared to corresponding values for a number of previously executed or representative queries 95, use of one or more indexes (e.g., inverted index(es)) often can significantly reduce the searching time.

In addition, the queries within set 20 preferably are organized into similarity-based clusters. For example, such clusters preferably have been formed based on similarities of the query execution plans and/or based on similarity of one or more of their observed query-execution characteristics. In such embodiments, it is preferable to compare the current query 12 only to a representative previously executed query (or a small set of representative queries) within each cluster, at least in the first instance. Then, in certain embodiments, once one or more candidate clusters have been identified in this manner, comparisons are made to other queries within the candidate cluster(s) to verify the match.

Figure 4:
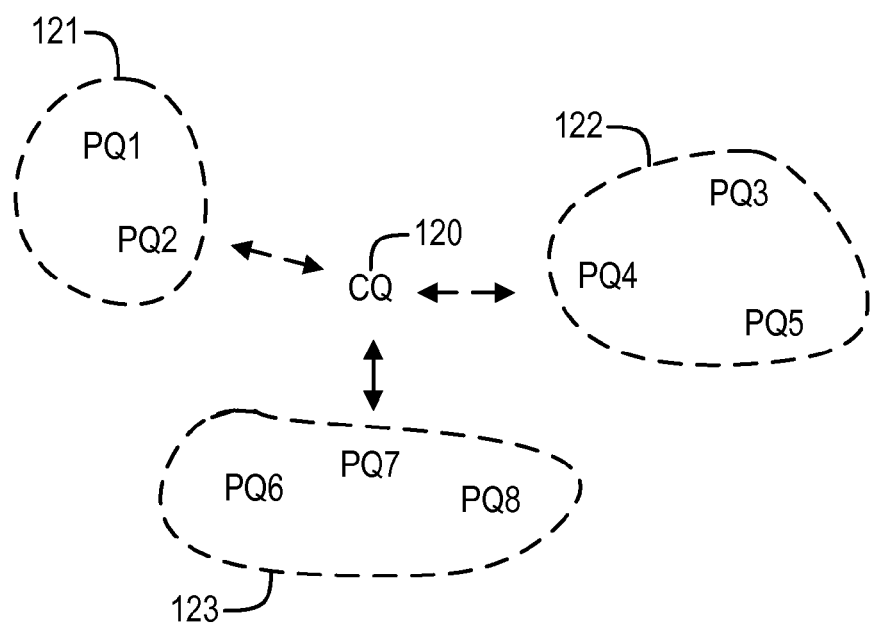
FIG. 4 illustrates the comparison of a current query to multiple clusters of previously executed queries.
Figure 5:
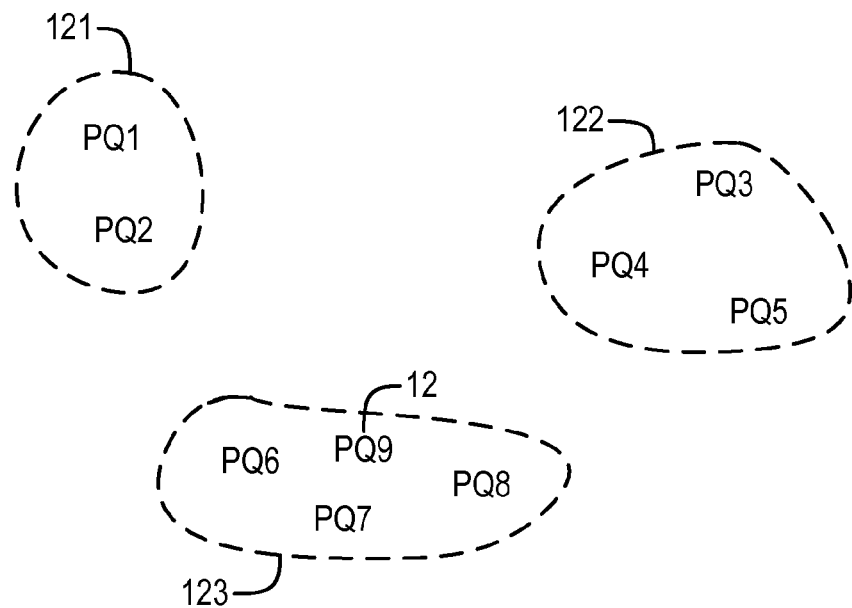
FIG. 5 illustrates the addition of a current query to an existing cluster.

An example is illustrated in FIG. 4 which shows a current query 120 and three separate clusters 121-123 which, in turn, include previous queries PQ1-PQ2, PQ3-PQ5 and PQ6-PQ8, respectively. In this example, the current query 120 is only compared to representative queries PQ2, PQ4 and PQ7 within clusters 121-123, respectively, at least in the first instance.

The actual selection of the matching previously executed query (or cluster of queries) by component 18 can be performed in a number of ways. For example, in one embodiment where a similarity score is calculated, the previously executed query having the highest score is identified and that query (or the cluster to which it belongs) is selected.

In cases where there are tying similarity scores, and/or in embodiments which only look for matches (e.g., certain hash-based techniques) and where more than one match is identified, additional processing preferably is performed. For example, when such a situation arises, alternate (e.g., more detailed and/or more processor-intensive) similarity scores preferably are calculated in order to identify the closest-matching candidate. In addition to, or instead of, performing such processing with respect to the particular previously executed queries, in embodiments where such queries are a part of a cluster, other previously executed queries within the cluster preferably also are evaluated in order to identify and then select the closest-matching cluster.

Also, as shown in FIG. 1, in certain embodiments of the invention, the determination made by component 18 also takes current database parameters 30 into account. For example, such information can be used to adjust the query-execution characteristics 90 based on changes in the database 13 that occurred since individual ones of the queries within set 20 were executed and/or to account for different processor loads.

In any event, the output of component 18 is the closest matching previously executed query or cluster of queries. Based on this match, component 22 assigns one or more execution characteristics to the current query 12. For example, in embodiments where a single previously executed query has been selected by component 18, all of the execution characteristics 90 for that selected previously executed query preferably are assigned to current query 12. In embodiments where a cluster has been selected, the query-execution characteristics assigned to the current query 12 preferably are based on an aggregation of corresponding values for all of the previously executed queries in such cluster, such as the mean or median of all such corresponding values.

In component 23, the performance of the current query 12 is managed based on the execution characteristics assigned to the current query 12 by component 22. Preferably, the goals of management component 23 include: (1) ensuring that low-execution time queries are not scheduled at the same time as high-execution time queries; and/or (2) attempting to schedule queries that use significant amounts of overlapping resources at different times. In addition, in certain embodiments of the invention, scheduler 23 takes into account other inputs 24, such as user-designated priorities for different competing query requests.

The foregoing goals can be taken account in different ways. One function of management component 23 in certain embodiments of the invention is to notify a user if the required resources or other expected characteristics of a submitted query 12 are outside of normal bounds so that the user can re-specify the query 12 if desired. Another function of management component 23 preferably is to assign resources (e.g., processor capacity and/or memory) to each query to be executed based on the assigned characteristics.

Upon execution of the current query 12 (at the time determined by scheduler 23), the query results 25 are presented to the user or to a separate automated process that submitted query 12. In addition, the characteristics of the query execution (e.g., cost of executing the query, particular systems resources that were utilized during execution of the query, and/or a measure of the impact on particular system resources) are determined by component 26.

Based on this information, the query plan 88 that was generated for query 12 by components 15-17 and/or based on the query statement 87, component 27 assigns the query 12 to a cluster. In the preferred embodiments, the query 12 is assigned to the same cluster that was selected by component 18 unless the query-execution characteristics determined for query 12 by component 26 are sufficiently different from the corresponding query-execution characteristics for the other queries in that cluster. Thus, keeping with the previous example, the current query 12 is added to cluster 123 and re-labeled as PQ9, because for future processing purposes it will be treated in the same manner as any other previously-executed query.

On the other hand, if the current query 12 does not belong in the cluster that was selected by component 18, based on its query-execution characteristics, as determined by component 26, then several options potentially are possible. For example, if one or more other clusters were potential matches (e.g., because they each had a very close, although not the highest, similarity score), then in certain embodiments the query-execution characteristics for the current query 12 are compared against the corresponding query-execution characteristics for the previously executed queries in such other "close" cluster(s) in order to determine if the current query 12 belongs in one of them.

Figure 6:
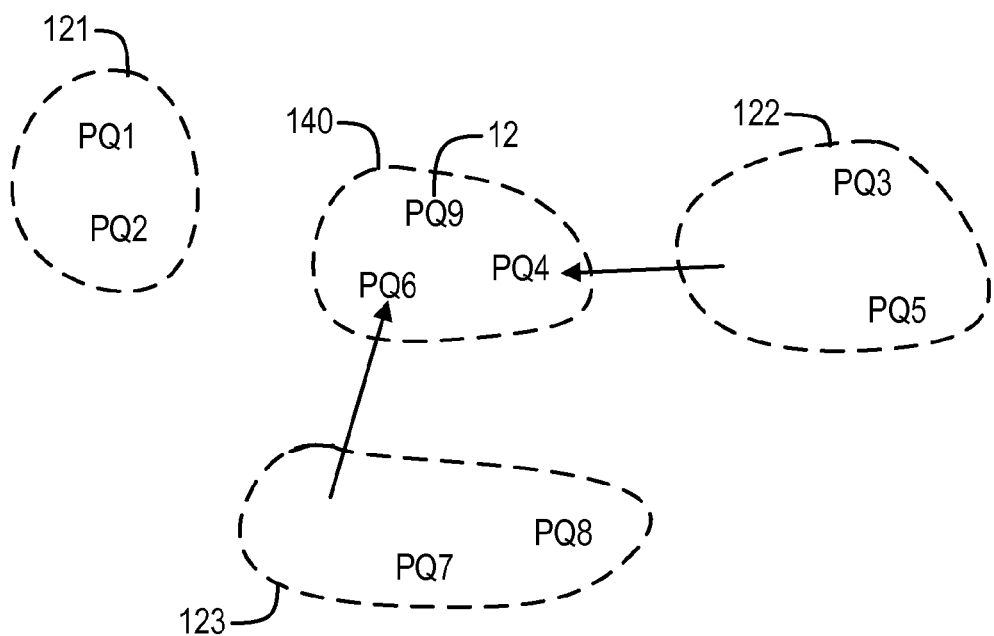
FIG. 6 illustrates the formation of a new cluster to include a current query and then certain re-clustering that is performed as a result of the new cluster.

If query 12 does not corporately belong in any such cluster, then a new cluster preferably is formed by component 27 to include the current query 12. In addition, component 12 preferably performs any re-clustering that is appropriate in view of the formation of the new cluster. An example is shown in FIG. 6. Here, a new cluster 140 has been created for the current query 12 (again, re-labeled as PQ9). However, due to the existence of the new cluster 140, the queries in nearby clusters are re-evaluated to determine whether they more properly belong in the new cluster 140 than in their existing clusters. As a result of this re-evaluation, query PQ4 is moved from cluster 122 to the new cluster 140 and query PQ6 is moved from cluster 123 to the new cluster 140. In the preferred embodiments, the updating of the set 20 of previously executed queries occurs on an ongoing basis as new queries 12 are processed.

Figure 7:
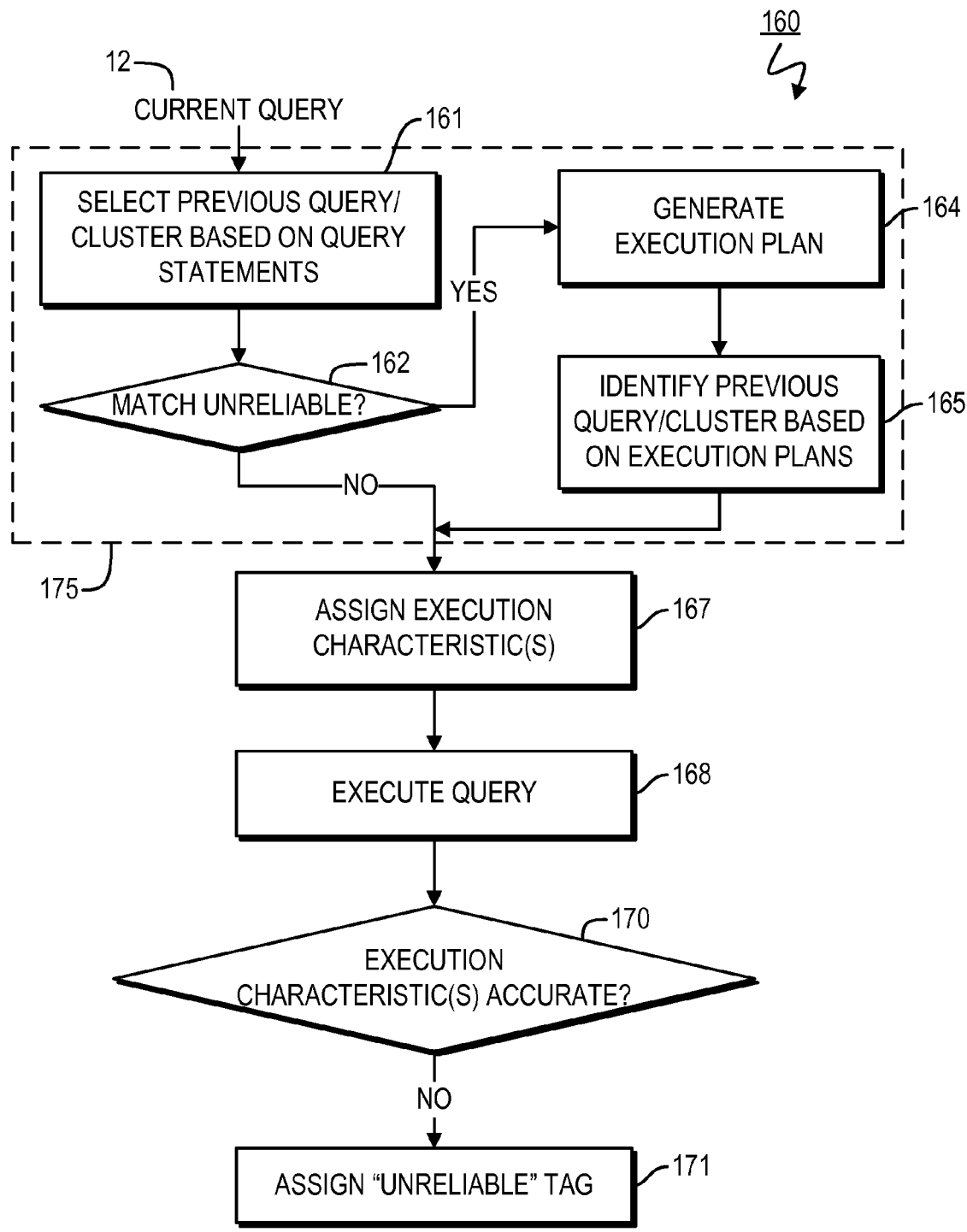
FIG. 7 is a flow diagram of a process for processing database queries.

FIG. 7 is a flow diagram illustrating a process 160 for using system 10 according to a representative embodiment of the present invention. Preferably, process 160 is fully automated, meaning that it can be implemented using computer-executable process steps or in any of the other ways described herein.

Initially, in step 161 a previous query or cluster of queries is selected from the set 20 of previously executed queries, based solely on the similarity of the query statement 87 for the input query 12 (e.g., by invoking components 14 and 18 of system 10) to the query statements for various previously executed queries within set 20. That is, an execution plan is neither generated nor used to select the previous query or cluster of queries, making performance of this step 161 relatively fast.

In step 162, a determination is made as to whether the match between the input query 12 and the previous query or cluster of queries selected in step 161 is unreliable. In the preferred embodiments, this step 162 is performed by simply determining whether the query or cluster of queries selected in step 161 previously has been tagged as being unreliable, as discussed in more detail below. However, as also described below, in certain embodiments a separate set of clusters is defined for queries whose query statements alone are not sufficiently reliable for selecting the appropriate previous query or cluster of queries; in such embodiments, a determination preferably is made as to whether the current query 12 is adequately similar to any of such previous queries or clusters of queries so as to conclude that the match made in step 161 is unreliable (e.g., using any of the similarity techniques described above). If so, then processing proceeds to step 164. Otherwise, processing proceeds to step 167.

In step 164, an execution plan 88 is generated for the current query 12 (e.g., using components 15-17 of system 10). Then, in step 165 a previous query or cluster of queries is selected (e.g., using component 18 of system 10) based on similarity of that execution plan 88 to corresponding execution plans 98 for previously executed or representative queries 95 within set 20, either alone or in combination with comparisons of the query statements 87 and 97.

In step 167, the execution characteristic(s) from the selected query or cluster of queries are assigned to the current query 12 (e.g., using component 22 of system 10). In step 168, the current query 12 is executed, using the generated plan (e.g., as generated in step 164) or (if not previously generated) by first generating a plan; preferably, query 12 is executed in step 168 in accordance with a schedule determined by component 23 of system 10. Then, in step 170 a determination is made as to whether the execution characteristic(s) assigned in step 167 were accurate, in view of the actual corresponding execution characteristics observed (e.g., by component 26 of system 10) during the query execution in step 168. If not, then processing proceeds to step 171. Otherwise, processing is complete for the current query 12.

In step 171, an "unreliable" tag is assigned. In certain embodiments and under certain circumstances, the tag is assigned only to the current query 12 (e.g., where the previous query or cluster of queries was selected based on a generated execution plan); in that case, a new cluster preferably is formed for the current query 12 (e.g., using component 27 of system 10). In other embodiments and/or under other circumstances, the "unreliable" tag is assigned to the selected cluster of queries (e.g., where such cluster was selected based solely on the query statements 87 and 97); in that case, the tagged cluster preferably is used for subsequent evaluations of the reliability of identified matches, as described above.

In still further embodiments, rather than automatically tagging the entire matching cluster, additional processing is performed to identify which previously executed queries 95 have query statements 97 that would have led to misclassifications.

Then, only those queries are tagged as having query statements which, when used alone, will lead to unreliable matches. It is noted that such additional processing can be performed during off-peak times for all or any portion of the previously executed queries within set 20. In addition, in certain embodiments such previously executed queries 95 tagged as having unreliable query statements 97 are grouped into clusters (e.g., based solely on their query statements) in order to further facilitate subsequent processing of current queries 12 (e.g., by using only a representative query 95 within each such cluster).

It is noted that the first portion 175 of process 160 is directed toward selecting a previously executed query or cluster of queries. Alternate embodiments of the invention use different approaches to this selection process and then use the rest of process 160 in the manner described above. For instance, in alternative embodiments either of subprocess 190 (shown in FIG. 8) or 210 (shown in FIG. 9) is used in place of subprocess 175 in alternate embodiments of the invention. Both such subprocesses 190 and 210 preferably are fully automated so that they can be performed using computer-executable process steps or in any other way described herein.

Figure 8:
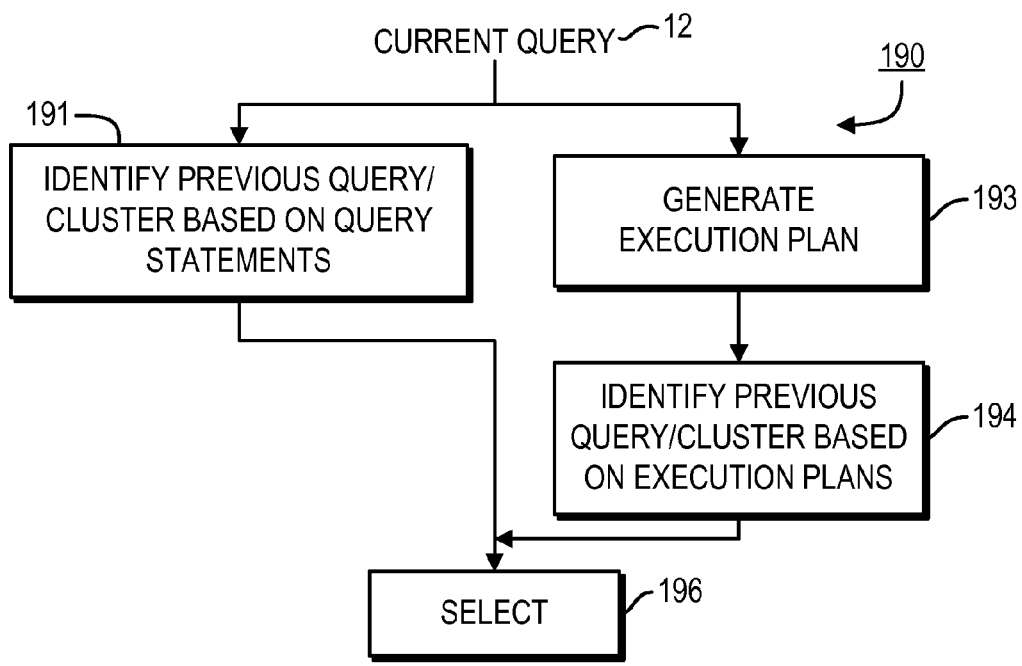
FIG. 8 is a flow diagram of a subprocess for selecting a previously executed query or cluster of queries according to a first alternate embodiment of the invention.
Figure 9:
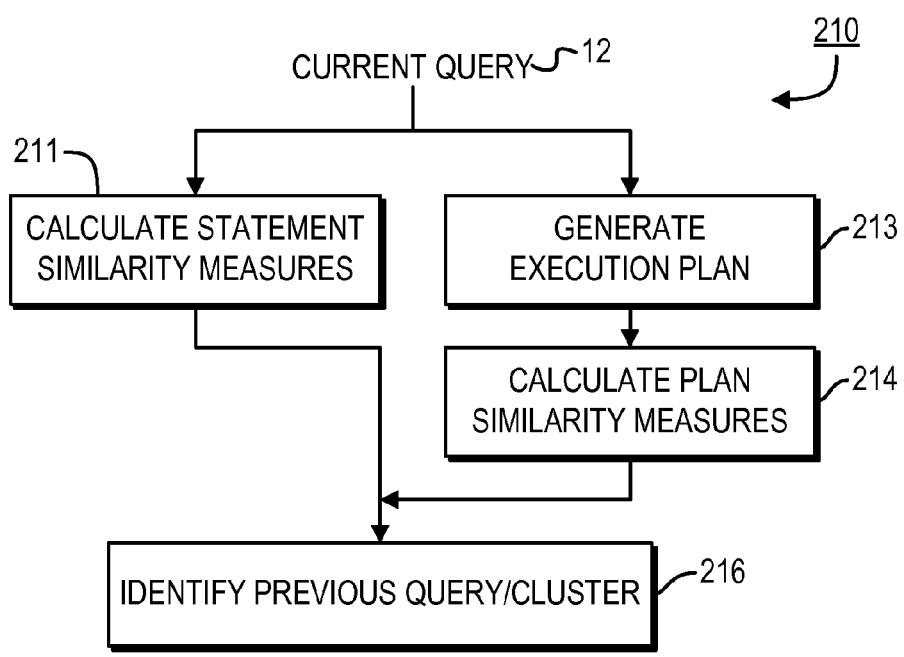
FIG. 9 is a flow diagram of a subprocess for selecting a previously executed query or cluster of queries according to a second alternate embodiment of the invention.

Referring first to FIG. 8, in step 191 a previous query or cluster of queries is selected based solely on comparisons of the query statement 87 for the current query 12 to query statements 97 for various previously executed or representative queries 95. Accordingly, this step is similar to step 161, discussed above.

In step 193, an execution plan is generated for the current query 12 (i.e., similar to step 164 discussed above). Then, in step 194 a previous query or cluster of queries is selected (e.g., using components 15-18 of system 10) based solely on comparisons of the query plan 88 for the current query 12 to query plans 98 for various previously executed or representative queries 95 (i.e., without using comparisons of query statements).

Finally, in step 196 a cluster is selected from between the clusters selected in steps 191 and 194, e.g., by performing a more detailed (i.e., more processor-intensive) similarity analysis between the current query 12 and each such cluster. In short, in this embodiment a cluster is selected based solely on comparisons of query statements 87 and 97 and then another cluster independently is selected based solely on comparisons of query plans 88 and 98; and the last of these two clusters is then selected as the one to use.

Process 210 (shown in FIG. 9) also selects a previous query or cluster of queries based on both comparisons of query statements 87 and 97 and comparisons of query plans 88 and 98. However, rather than selecting from independently selected queries or clusters of queries, process 210 combines the similarity results of both kinds of comparisons in order to make a final selection. Moreover, unlike process 175, process 210 combines such results each time without first attempting to obtain a match based solely on comparisons of query statements 87 and 97.

More specifically, in step 211, similarity measures are calculated between the current query 12 and each previously executed query (or cluster of queries) within set 20 based on comparisons of query statements 87 and 97. In step 213 a query plan is generated for the current query 12. Then, in step 214 similarity measures are calculated between the current query 12 and each previously executed query (or cluster of queries) within set 20 based on comparisons of query plans 88 and 98.

Finally, in step 216 a previously executed query or cluster of queries is selected based on the foregoing similarity measures. For this purpose, a composite similarity measure preferably is calculated for each previously executed query or cluster of queries within set 20 using, for example, a weighted average of the two measures (e.g., with the weights being based on reliability estimates) and then the previously executed query or cluster of queries having the highest composite similarity measure preferably is selected.

In the foregoing embodiments, execution plans 88 and 98 are compared to each other in their entirety. However, in alternate embodiments, if historical execution times and/or other execution characteristics are available for different portions of (e.g., sub-trees) of the execution plans for the previously executed queries within set 20, then rather than matching plans 88 and 98 in whole, matches of such sub-trees preferably are identified. Then, corresponding execution characteristics for the current query 12 preferably are synthesized based on system assumptions (e.g., parallelism) and the corresponding execution characteristics for such matching sub-trees. Moreover, if such sub-tree information is not separately measured, in certain embodiments such information is parsed out using regression analysis or other statistical techniques.

As noted above, representative embodiments of the present invention associate query plans with previously executed individual queries or clusters of queries and their historical actual costs. In certain embodiments, such techniques are used to improve the cost estimation of potential query plans within the database (in addition to, or instead of, queries submitted by an external scheduler). In such embodiments, these cost estimates preferably are then used to improve the selection of a query plan when comparing alternatives.

System Environment.

Generally speaking, except where clearly indicated otherwise, all of the systems, methods and techniques described herein can be practiced with the use of one or more programmable general-purpose computing devices. Such devices typically will include, for example, at least some of the following components interconnected with each other, e.g., via a common bus: one or more central processing units (CPUs); read-only memory (ROM); random access memory (RAM); input/output software and circuitry for interfacing with other devices (e.g., using a hardwired connection, such as a serial port, a parallel port, a USB connection or a firewire connection, or using a wireless protocol, such as Bluetooth or a 802.11 protocol); software and circuitry for connecting to one or more networks (e.g., using a hardwired connection such as an Ethernet card or a wireless protocol, such as code division multiple access (CDMA), global system for mobile communications (GSM), Bluetooth, a 802.11 protocol, or any other cellular-based or non-cellular-based system), which networks, in turn, in many embodiments of the invention, connect to the Internet or to any other networks); a display (such as a cathode ray tube display, a liquid crystal display, an organic light-emitting display, a polymeric light-emitting display or any other thin-film display); other output devices (such as one or more speakers, a headphone set and a printer); one or more input devices (such as a mouse, touchpad, tablet, touch-sensitive display or other pointing device, a keyboard, a keypad, a microphone and a scanner); a mass storage unit (such as a hard disk drive); a real-time clock; a removable storage read/write device (such as for reading from and writing to RAM, a magnetic disk, a magnetic tape, an opto-magnetic disk, an optical disk, or the like); and a modem (e.g., for sending faxes or for connecting to the Internet or to any other computer network via a dial-up connection). In operation, the process steps to implement the above methods and functionality, to the extent performed by such a general-purpose computer, typically initially are stored in mass storage (e.g., the hard disk), are downloaded into RAM and then are executed by the CPU out of RAM. However, in some cases the process steps initially are stored in RAM or ROM.

Suitable devices for use in implementing the present invention may be obtained from various vendors. In the various embodiments, different types of devices are used depending upon the size and complexity of the tasks. Suitable devices include mainframe computers, multiprocessor computers, workstations, personal computers, and even smaller computers such as PDAs, wireless telephones or any other appliance or device, whether stand-alone, hard-wired into a network or wirelessly connected to a network.

In addition, although general-purpose programmable devices have been described above, in alternate embodiments one or more special-purpose processors or computers instead (or in addition) are used. In general, it should be noted that, except as expressly noted otherwise, any of the functionality described above can be implemented in software, hardware, firmware or any combination of these, with the particular implementation being selected based on known engineering tradeoffs. More specifically, where the functionality described above is implemented in a fixed, predetermined or logical manner, it can be accomplished through programming (e.g., software or firmware), an appropriate arrangement of logic components (hardware) or any combination of the two, as will be readily appreciated by those skilled in the art.

It should be understood that the present invention also relates to machine-readable media on which are stored program instructions for performing the methods and functionality of this invention. Such media include, by way of example, magnetic disks, magnetic tape, optically readable media such as CD ROMs and DVD ROMs, or semiconductor memory such as PCMCIA cards, various types of memory cards, USB memory devices, etc. In each case, the medium may take the form of a portable item such as a miniature disk drive or a small disk, diskette, cassette, cartridge, card, stick etc., or it may take the form of a relatively larger or immobile item such as a hard disk drive, ROM or RAM provided in a computer or other device.

The foregoing description primarily emphasizes electronic computers and devices. However, it should be understood that any other computing or other type of device instead may be used, such as a device utilizing any combination of electronic, optical, biological and chemical processing.

Additional Considerations.

Several different embodiments of the present invention are described above, with each such embodiment described as including certain features. However, it is intended that the features described in connection with the discussion of any single embodiment are not limited to that embodiment but may be included and/or arranged in various combinations in any of the other embodiments as well, as will be understood by those skilled in the art.

Similarly, in the discussion above, functionality sometimes is ascribed to a particular module or component. However, functionality generally may be redistributed as desired among any different modules or components, in some cases completely obviating the need for a particular component or module and/or requiring the addition of new components or modules. The precise distribution of functionality preferably is made according to known engineering tradeoffs, with reference to the specific embodiment of the invention, as will be understood by those skilled in the art.

Thus, although the present invention has been described in detail with regard to the exemplary embodiments thereof and accompanying drawings, it should be apparent to those skilled in the art that various adaptations and modifications of the present invention may be accomplished without departing from the spirit and the scope of the invention. Accordingly, the invention is not limited to the precise embodiments shown in the drawings and described above. Rather, it is intended that all such variations not departing from the spirit of the invention be considered as within the scope thereof as limited solely by the claims appended hereto.

What is claimed is:

1. A method of processing database queries, comprising:
    obtaining a current database query to be executed;
    generating a plan for executing the current database query;
    identifying, by one or more processors, a cluster from among plural clusters maintained in a data structure, wherein each of the plural clusters includes a corresponding set of plural previously executed database queries, wherein identifying the cluster from among the plural clusters is based on similarity of the plan for executing the current database query to execution-plan information representing the identified cluster, wherein the execution-plan information comprises representative information derived from execution-plan information of multiple ones of the plural previously executed database queries in the identified cluster;
    assigning, by the one or more processors, a query-execution characteristic to the current database query based on corresponding characteristic information representing the identified cluster;
    managing performance of the current database query based on the query-execution characteristic; and
    executing the current database query.

2. A method according to claim 1, further comprising adding the current database query to the identified cluster.

3. A method according to claim 1, wherein the similarity of the plan for executing the current database query to the execution-plan information representing the identified cluster is determined by performing a hash on at least a portion of the plan for executing the current database query.

4. A method according to claim 1, wherein the similarity of the plan for executing the current database query to the execution-plan information representing the identified cluster is determined based on one or more of text-edit distance and tree-edit distance between the plan for executing the current database query and the execution-plan information representing the identified cluster.

5. A method according to claim 1, wherein the query-execution characteristic comprises an estimated cost of executing the current database query.

6. A method according to claim 1, wherein the query-execution characteristic comprises identification of a resource that is expected to be used when executing the current database query.

7. A method according to claim 1, wherein the plan for executing the current database query and the execution-plan information representing the identified cluster have been annotated with information pertaining to database parameters, and wherein similarity of the plan for executing the current database query to the execution-plan information representing the identified cluster is based on said information pertaining to database parameters.

8. A method according to claim 1, wherein identifying the cluster from among the plural clusters also is based on similarity between a statement of the current database query and corresponding query-statement information representing the identified cluster.

9. A method according to claim 1, wherein the plan for executing the current database query has a hierarchical structure.

10. A method of processing database queries, comprising:
    maintaining information regarding generated execution plans, together with corresponding historical execution data, for a plurality of previously executed database queries;
    generating an execution plan for a current database query;
    identifying, by one or more processors, a cluster from among plural clusters that are maintained in a data structure, wherein each cluster includes a corresponding set of the previously executed database queries, wherein the identifying is based on similarity of the execution plan for the current database query to execution-plan information representing the identified cluster, wherein the execution-plan information comprises representative information derived from execution-plan information of multiple ones of the previously executed database queries in the identified cluster;
    estimating, by the one or more processors, a characteristic of executing the current database query based on the historical execution data for the identified cluster;
    managing performance of the current database query based on the characteristic; and
    executing the current database query.

11. A method according to claim 10, wherein the previously executed database queries are clustered into the plural clusters based on similarity of the generated execution plans and similarity of at least one query-execution characteristic pertaining to actual execution of the previously executed database queries.

12. A method according to claim 10, further comprising adding the current database query to the identified cluster.

13. A method according to claim 10, wherein the information regarding the execution plan for the current database query comprises a hash on at least a portion of the execution plan for the current database query.

14. A method according to claim 10, wherein the characteristic comprises an estimated cost of executing the current database query.

15. A method according to claim 10, wherein the characteristic comprises identification of a resource that is expected to be used when executing the current database query.

16. A computer-readable storage medium storing computer-executable process steps for processing database queries, said process steps comprising steps of:
    obtaining a current database query to be executed;
    generating a plan for executing the current database query;
    identifying, by one or more processors, a cluster from among plural clusters that are maintained in a data structure, wherein each cluster includes a corresponding set of plural previously executed database queries, wherein identifying the cluster from among the plural clusters is based on similarity of the plan for executing the current database query to execution-plan information representing the identified cluster, wherein the execution-plan information comprises representative information derived from execution-plan information of multiple ones of the plural previously executed database queries in the identified cluster;
    assigning a query-execution characteristic to the current database query based on corresponding characteristic information representing the identified cluster;
    managing performance of the current database query based on the query-execution characteristic; and
    executing the current database query.

17. A computer-readable medium according to claim 16, wherein the similarity of the plan for executing the current database query to the execution-plan information representing the identified cluster is determined by performing a hash on at least a portion of the plan for executing the current database query.

18. A computer-readable medium according to claim 16, wherein the similarity of the plan for executing the current database query to the execution-plan information representing the identified cluster is determined based on one or more of text-edit distance and tree-edit distance between the plan for executing the current database query and the execution-plan information representing the identified cluster.

* * * * *

UNITED STATES PATENT AND TRADEMARK OFFICE
CERTIFICATE OF CORRECTION

| | | |
|---|---|---|
| PATENT NO. | : 7,840,556 B1 | Page 1 of 1 |
| APPLICATION NO. | : 11/831902 | |
| DATED | : November 23, 2010 | |
| INVENTOR(S) | : Umeshwar Dayal et al. | |

It is certified that error appears in the above-identified patent and that said Letters Patent is hereby corrected as shown below:

In column 15, line 1, in Claim 17, before "medium" insert -- storage --.

In column 15, line 7, in Claim 18, before "medium" insert -- storage --.

Signed and Sealed this
Fifteenth Day of March, 2011

David J. Kappos
*Director of the United States Patent and Trademark Office*